United States Patent [19]

Stalick

[11] Patent Number: 4,740,964
[45] Date of Patent: Apr. 26, 1988

[54] ALARM INDICATIONS SIGNAL DETECTION APPARATUS

[75] Inventor: Victor J. Stalick, Richardson, Tex.

[73] Assignee: Rockwell International Corporation, El Segundo, Calif.

[21] Appl. No.: 876,637

[22] Filed: Jun. 20, 1986

[51] Int. Cl.[4] .............................................. H04J 3/12
[52] U.S. Cl. ................. 370/110.1; 307/234; 370/13
[58] Field of Search ............... 370/13, 110.1; 307/234, 307/517, 362, 363, 236; 328/108, 109

[56] References Cited

U.S. PATENT DOCUMENTS 3,778,727  12/1973  Williams .............................. 307/234
4,012,645   3/1977  Moorey ................................ 307/363

Primary Examiner—Douglas W. Olms
Assistant Examiner—Wellington Chin
Attorney, Agent, or Firm—Bruce C. Lutz; V. L. Sewell; H. Fredrick Hamann

[57] ABSTRACT

A circuit using the non-linear charge characteristics of a RC network to, in combination with a consecutive bit logic detector circuit, establish a given integrated output if the consecutive bit check indicates noncorrelation anymore often than once per framing bit. This is accomplished by having the discharge rate for correlation greatly exceed the amount of charge for noncorrelation at the amplitude levels against which the signal is checked relative a reference for determining whether or not in fact an alarm indication signal does exist.

5 Claims, 1 Drawing Sheet

ALARM INDICATIONS SIGNAL DETECTION APPARATUS

The present invention is generally related to electronics and more specifically related to a circuit for economically detecting an alarm indication signal used to replace an unsatisfactory information signal on communications lines using a Bell operating company protocol where this alarm indication signal is used in order to inhibit the activation of unproductive down stream alarms and to prevent unnecessary protection switching at downstream stations.

Communication channels following or using the Bell Operating Company (BOC) signal protocols often transmit information over these channels at what is designated a DS3 signal protocol. These channels or lines are digital data paths operating at 44.736 megabits per second with AMI (alternate-mark-inversion) and B3ZS (Bipolar, 3 Zero Substitution) coding. The DS3 signal format is derived from the time division multiplexing of seven DS2 (6.312 megabit per second) signals. The unique framing format (as described in Bell Technical Advisory No. 34) employs a framing bit or "control bit" in every 85th bit position in the DS3 format signal. The intervening 84 bits are composed of 7 DS2 signals sequentially interleaved. These DS2 signals also have an unique framing format as described in the Bell Technical Advisory No. 34 referenced above. Occasionally, when there is a failure in the transmission network which results in the need to quiet office alarms down stream from the failure and also to indicate the reason for the abnormality, a signal described as a DS3 blue signal is generated. This blue signal is also called an alarm inhibit signal, keep alive signal or alarm indication signal by the Bell operating companies. This signal is described in Bell Technical Advisory TA TSY 0000191. The signal contains the normal framing format of the DS3 format signal with the data bits replaced by a continuous 101010 . . . pattern.

The recognition of this specific pattern enables the down stream equipment to silence office alarms resulting from the loss of normal traffic and alert the local maintenance people that the trouble is originating from up stream sources rather than with or in their equipment. The circuitry used to detect this signal has in the past contained a DS3 frame detection circuit followed by a 101010 . . . pattern detection circuit with an integration circuit to insure that the pattern is long lived. In some instances the DS3 frame detection circuit is also used for extracting normal traffic data.

There are, however, circumstances where there is no need to extract the data from the incoming signal (such as at the input of a DS3 transmission system) but it is still necessary to detect the presence of the "blue signal". In such an instance, the elimination of the cost of a DS3 frame detector used only for the detection of blue signal conditions is highly desirable. The present circuit is able to detect the blue signal conditions and distinguish between these conditions and any other possible set of signals on the system by detecting the correlation of consecutive bits in the data stream and detecting when the correlation of logic levels between consecutive bits exceeds that for a blue signal condition. The signal correlation for a blue signal condition is 1.18%. The worst case condition of normal data signals on each of the DS2 channels being a 101010 pattern instead of apparently randomly changing logic level values would still embed a DS2 framing bit every 49th clock position. Such a situation would result in a correlation rate of 3.22% or approximately three times the correlation rate of that obtained with a blue signal. Thus, in the present invention a comparator input threshold is chosen which in combination with an integrator receiving the outputs of the correlation circuit will distinguish between the blue signal correlation rate and any higher rate resulting from other signal patterns.

It is thus an object of the present invention to provide a more cost effective "blue signal" detector.

Other objects and advantages of the present invention will be apparent from a reading of the specification and appended claims in conjunction with the drawings wherein:

DETAILED DESCRIPTION

Figure 1:
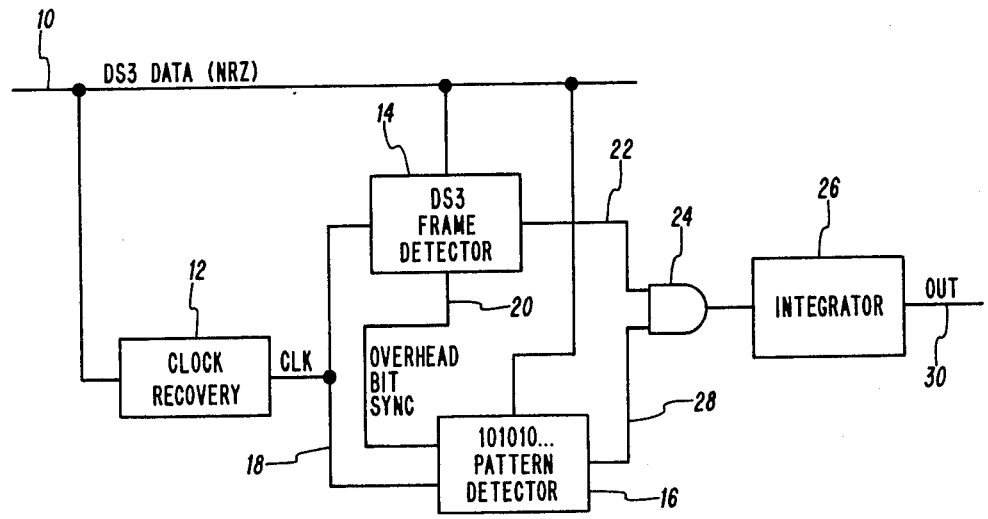
FIG. 1 is a block diagram of a prior art blue signal detector.

In FIG. 1 a line or lead 10 is connected to a source of DS3 data. Lead 10 is connected to a clock recovery circuit 12 a DS3 frame detector 14 and a logic 101010 pattern detector 16. An output of clock recovery circuit 12 is connected via a lead 18 to DS3 frame detector 14 and to a first input of the pattern detector 16. An output lead 20 of frame detector 14 is connected to a second input of pattern detector 16. An output 22 of frame detector 14 is connected to one input of an AND gate 24 whose output is connected to an integrator 26. Pattern detector 16 provides outputs signals on a lead 28 to AND gate 24. Finally, an output lead 30 supplies apparatus output signals from the detection circuit of FIG. 2 on lead 30.

Figure 2:
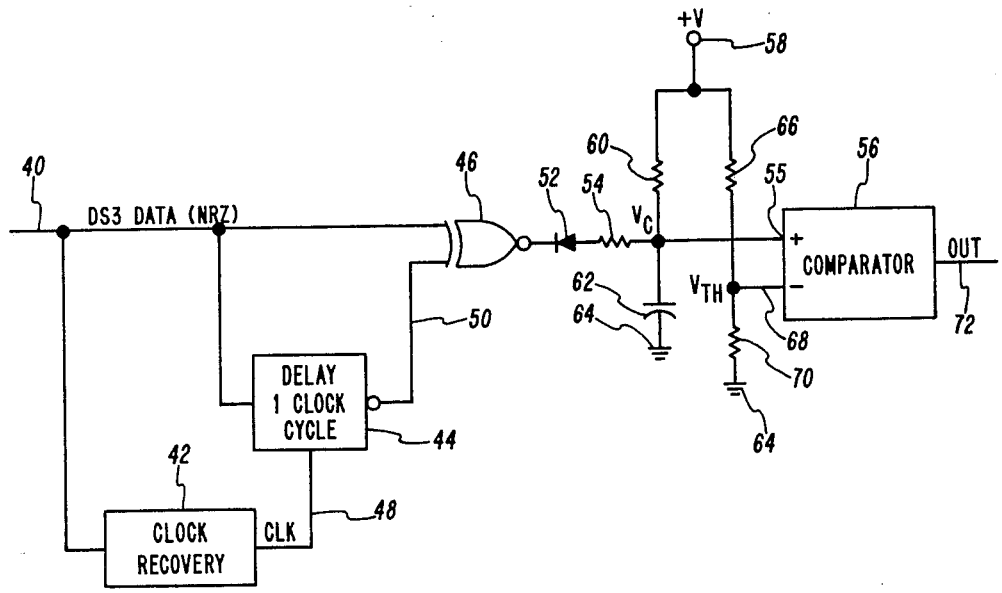
FIG. 2 is a block/schematic diagram of the simplified blue signal detector using the teachings of the present invention.

In FIG. 2 a lead 40 provides DS3 data representative input signals to a clock recovery circuit 42, a one data bit time delay circuit 44 and to a first input of an exclusive OR gate 46. A clock signal is provided at the output of clock recovery circuit 42 on a lead 48 to the delay circuit 44. The output of circuit 44 is provided on lead 50 to a second input on exclusive OR gate 46. An output of exclusive OR gate of 46 is provided through a diode 52 and a resistor 54 to an input 55 of a comparator 56. A positive terminal 58 is connected to one end of a resistor 60 which has its other end connected to the input 55 of comparator 56. A capacitor 62 is connected between input 55 and ground or common 64. A resistor 66 is connected between positive power supply 58 and a second input 68 of comparator 56. A resistor 70 is connected between input 68 and ground 64. An apparatus output is provided from comparator 56 on a lead 72.

OPERATION

As previously indicated, the circuitry of the present invention is designed to detect the occurrence of a blue signal data pattern which comprises a plurality of 101010 logic level signals with interspersed framing bit signals. The DS3 format in combination with this blue signal as outlined by the Bell operating company technical advisory results in a DS3 framing bit, 84 intervening changing logic level bits and then another framing bit. The blue signal data pattern always commences with a bit of one polarity and ends with a bit of the opposite polarity. Thus, there will be no correlation between adjacent bits during detection of the blue signal but there will always be a correlation between the framing bit and one of the blue signal bits on either side. The framing bit itself also changes polarity on a prescribed basis. The prior art as illustrated in FIG. 1 used the detector 14 to keep track of the framing bit and in combination with the clock recovery circuit 12 would tell the pattern detector 16 the appropriate time to ignore the detection of an incoming framing bit so that the AND gate 24 provides a continuous signal to the integrator 26 when the frame detector 14 has synchronized with the frame bit and the pattern detector 16 is receiving a continuous supply of alternating logic value data bits. When the alternating logic value pattern is interrupted, the detector 16 stops providing an output and thus the integrator 26 will discharge so as to prevent further outputs. The output signal, while it exists, tells the local equipment and service technicians that the problem is elsewhere in the system. As indicated previously, the blue signal format overrides the existence of any DS2 framing bits. Such DS2 framing bits would normally occur in the data stream intermediate the DS3 framing bit signals.

In the present invention of FIG. 2, the delay element 44 is used to permit comparison of two data bits in adjacent data bit periods. The one clock cycle delay of 44 and the inversion at the output of delay 44 thus provides identical logic value inputs to the exclusive OR gate 46 if the adjacent data bits are were originally of opposite logic levels. This will inhibit the output of the gate 46. On the other hand if the two data bits being compared were of the same polarity, in other words, both were logic ones or both were logic 0's, the input to the exclusive OR gate 46 will be opposite in polarity and the gate will provide a negative output pulse. This negative pulse will discharge capacitor 62 during the time that the comparison of the two data bits are indicated to have the same logic value. The rate of discharge will be determined by the time constant set up by resistor 54 and the capacitor 62. The lowest level that capacitor 62 can discharge to is determined by the voltage drop across diode 52 and the voltage division between resistors 54 and 60. During the time that the data bits are of the opposite polarity, capacitor 62 will charge at an exponential rate determined by the resistor 60 and the capacitor 62. Diode 52 prevents the charging of capacitor 62 from the output of the exclusive OR gate 46. Resistors 66 and 70 establish a reference or comparison threshold for the comparator 56. If the level of voltage across capacitor 62 exceeds the set threshold value, a positive output will be provided by comparator 56.

A critical design of the invention is to adjust the charge and discharge time constants of the resistors 54 and 60 in combination with the capacitor 62 so that the capacitor 62 charges slowly for every indication of noncorrelation (the adjacent data bits are of opposite polarity) and discharges very fast when there is correlation between adjacent data bits being detected. When there is a blue signal condition existent, there will be correlation every 85th or 86th clock cycle between the DS3 data bit and either the beginning or end of the changing logic value blue signal. This results in a signal correlation rate of 1.18%. If there is only one other pair of noncorrelating bits between each of the framing bits, the correlation rate jumps to 2.32%. The present circuit can distinguish between these two correlation rates. In a signal arrived by a standard telecommunications network, the same DS3 framing pattern would exist, however, the data bits would tend to be random and would cause the data bits to be correlated approximately 50% of the time. In the worst case, the data bits would have a logic 101010 pattern but they would contain framing bits provided by the DS2 signal format embedded in the DS3 signal. The 6.312 megabit per second DS2 pattern provides a framing bit every 49th clock position. In the worst case pattern there would be a data bit correlation every 49th or 50th bit position of the DS2 signal. When the 7 DS2 patterns are multiplexed into the DS3 rate, the result would be that there would be an added correlation between data bits occurring every 49 clock cycles in addition to the correlation occurring every 85 or 86 clock cycles. When this situation of DS2 framing bit and DS3 framing bit correlations are added together the resulting correlation rate is 3.22%. This is approximately three times the correlation rate of the blue signal correlation rate. Thus, the circuit with proper design can easily distinguish the difference between the blue signal condition and the worst signal condition of a properly operating communication channel where the data on all 7 of the DS2 channels is locked into a logic 101010 pattern. The threshold voltage as set by resistors 66 and 70 should be considerably above $(V58-0.6)*(1-R54/(R54+R60))$ to assure that noise and etc. does not cause random triggering of the comparator 56. The time constant $R60*C62$ is obtained from normal time constant equations. This time constant should be adjusted to assure that the voltage at input 55 will not cross over the threshold voltage on lead 68 until several DS3 frame lengths of blue signal have been detected.

One embodiment of the present invention used a 300 ohm resistor for resistor 54, a 5 volt signal for power supply 58, a 20K resistor for resistor 60 and a 0.001 microfarad capacitor for capacitor 62. The resistors 66 and 70 were both 20K resistors.

Thus far the invention has been discussed using NRZ or non-return to zero data. However, the inventive concept can be easily modified to use return to zero data by checking for correlation on a clock edge. This can be accomplished by using a clock edge sensitive device such as a D-flipflop between the exclusive OR gate 46 and the diode 52.

While I have illustrated one embodiment of the inventive concept and suggested an alternate embodiment, I do not intend to be limited merely to the embodiments discussed or the impedance values illustrated, but only by the scope of the inventive concept as defined by the appended claims wherein

I claim:

1. Apparatus for detecting a "blue signal" condition in a DS3 type communication channel comprising, in combination:
   exclusive OR circuit means, including first and second input means and output means;
   apparatus signal input means for supplying a signal indicative of the DS3 signal channel being monitored to said first input means of said exclusive OR circuit means;
   delay means, connected between said apparatus signal input means and said second input means of said exclusive OR means, for supplying a delayed version of the DS3 signal thereto;
   signal comparator means, including signal and reference input means and apparatus output means;
   reference signal means for supplying a reference signal to said reference input means of said signal comparator means; and;

integrator means, connected between said output means of said exclusive OR circuit means and said signal input means of said signal comparator means, the integrator means being charged only when consecutive pulses in the DS3 signal channel being monoitored are of opposite polarity, the comparator providing an output only when a comparatively large number of consecutive data bits are of opposite polarity over several frames of data.

2. The method of detecting a DS3 AIS (alarm indication signal) comprising alternating logic value signals interposed between periodic DS3 framing signals comprising the steps of:

exclusive ORing the present bit with the next previous bit to provide a first result signal;

integrating said first result signal to produce a second result signal; and comparing said second result signal with a reference to provide an output only when the amplitude of said second result signal is greater than said reference signal.

3. The method of detecting the occurrence of an alternating logic value signal interposed between periodic framing signals comprising the steps of:

correlating the present bit with the next previous bit in a data stream to provide a first result signal for each positive correlation and a second result signal for each negative correlation;

integrating said first and second result signals to produce a third result signal which increases comparatively less upon receipt of each first result signal than it decreases upon receipt of each second result signal; and comparing said third result signal with a reference to provide an output only when the relative amplitudes of said third and reference signals change in a predetermined manner.

4. Apparatus for detecting the occurrence of a continuously alternating logic value signal interposed between periodic framing signals whose logic value will always correlate with one of the adjacent non-framing bits comprising, in combination:

first means for correlating the present bit with the next previous bit in a data stream to provide a first result signal for each positive correlation and a second result signal for each negative correlation;

second means, connected to said first means for receiving signals therefrom, for integrating said first and second result signals to produce a third result signal which changes in a first amplitude direction comparatively less upon receipt of each second result signal than it changes in a second amplitude direction, opposite said first directions, upon receipt of each first result signal; and third means, connected to receive signals from said second means, for comparing said third result signal with a reference to provide an output only when the relative amplitudes of said third and reference signals change in a predetermined manner.

5. Apparatus for detecting the occurrence of a continuously non-correlative logic value signal interposed between periodic framing signals whose logic value will always correlate with one of the adjacent non-framing bits and distinguish between said continuously non-correlative signal and any other signal having as few as one correlation per framing period comprising, in combination:

first means for correlating the present bit with the next previous bit in a data stream to provide a first result signal for each positive correlation and a second result signal for each negative correlation;

second means, connected to said first means for receiving signals therefrom, for integrating said first and second result signals to produce a third result signal which increases comparatively less upon receipt of each second result signal than it decreases upon receipt of each first result signal; and third means, connected to receive signals from said second means, for comparing said third result signal with a reference to provide an output only when the relative amplitudes of said third and reference signals change in a predetermined manner.

* * * * *